J. C. KING.
ELECTRODE AND COATING THEREFOR.
APPLICATION FILED JULY 31, 1916.
1,223,986.
Patented Apr. 24, 1917.
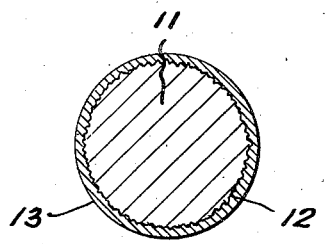
Witnesses
Inventor
J. C. King
By
Attys

UNITED STATES PATENT OFFICE.

JESSE CRITZ KING, OF MONTREAL, QUEBEC, CANADA.

ELECTRODE AND COATING THEREFOR.

1,223,986.  Specification of Letters Patent.  Patented Apr. 24, 1917.

Application filed July 31, 1916. Serial No. 112,443.

*To all whom it may concern:*

Be it known that I, JESSE CRITZ KING, a citizen of the United States, and resident of the city of Montreal, in the Province of Quebec and Dominion of Canada, have invented certain new and useful Improvements in Electrodes and Coating Therefor, of which the following is a full, clear, and exact description.

This invention relates to improvements in electrodes for use in electric furnaces and the like, and coating therefor, and the object of the invention is to provide an electrode having on the outer surface thereof a thin coating of material designed to protect the body of the electrode from combination with gases, particularly oxygen, at all parts of the surface not in actual operation.

It has been found that the electrodes of electric furnaces, which are made usually of carbon, waste or burn away at points remote from the active end, thus reducing the efficiency and life of the electrode. It is obvious that an electrode will become heated to quite high temperatures for a considerable distance back from the active end. This heating renders the carbon of the electrode more or less readily combinable with oxygen of the air or with other gases, with the result that the electrode burns away in parts, thus reducing the sectional area and consequently altering the resistance and conductivity of the electrode, and placing it in such condition that it burns away more rapidly with the passage of the electric current than should be the case. It is apparent, therefore, that if the surface of the electrode can be covered with an incombustible material, the electrode proper will be maintained of full size and efficiency, and that the wasting away will be limited to that caused by the passage of the arc. I have found a mixture of fire-clay and graphite most suitable for this purpose. This mixture is preferably applied to the electrode while the same is in plastic condition, as described in my copending application, Ser. No. 99,104, filed May 22nd, 1916. After application of the protective coating, the electrode is baked, so that the electrode and coating become for all practical purposes integral.

In the drawing which illustrates the invention:—

The figure represents a cross sectional view of an electrode.

Referring more particularly to the drawings, 11 designates the electrode proper of carbon having the surface 12 thereof roughened by any suitable means, and having applied thereto a coating 13 comprising a mixture of graphite and fire-clay. This coating mixture is applied to the carbon preferably while the same is in plastic condition, and the whole is then baked to drive off the moisture and harden the electrode and its coating. The proportions of clay and graphite may vary considerably, ranging from a comparatively small amount of graphite to a comparatively large amount of graphite, with only sufficient clay to bind the same together, but for ordinary purposes, I prefer to use a mixture of approximately fifty parts of graphite and fifty parts of clay by weight.

When an electrode thus coated is used in a furnace or other apparatus wherein a large portion of the electrode is subject to high heat and the action of gases, the mass remains substantially inert, as neither the clay nor the graphite will be attacked by oxygen or other gases present. As is well known, graphite is that form of carbon which even at extremely high temperatures enters not at all, or only with great reluctance, into compounds with oxygen or other gases. Neither the fire-clay nor the graphite alone would form a perfect coating, but a judicious mixture of the two products a coating having approximately the same expansion and contraction as the carbon of the electrode, and this coating is therefore not liable to be split off by the alternate heating and cooling of the electrode, nor is it liable to crack and expose portions of the electrode to the action of gases. The materials of the coating being sufficiently finely divided and the mixture applied in suitable proportions, the coating forms an impenetrable barrier between the electrode and gases in the furnaces, the interstices between the particles of graphite and clay being so small that the molecules of gas will not enter.

Having thus described my invention, what I claim is:—

1. An electrode for electric furnaces having a surface coating of fire-clay and graphite.

2. An electrode for electric furnaces having a coating of mixed fire-clay and graphite, the mixture having approximately the same expansion and contraction as the material of the electrode.

3. A coating for electrodes for electric furnaces comprising a mixture of fire-clay and graphite.

4. A coating for electrodes for electric furnaces comprising a mixture of twenty-five to seventy-five parts of graphite and seventy-five to twenty-five parts of fire-clay, by weight.

In witness whereof, I have hereunto set my hand, in the presence of two witnesses.

JESSE CRITZ KING.

Witnesses:
S. R. W. ALLEN,
D. H. SHOPIN.